United States Patent
Richardson et al.

[11] Patent Number: 5,842,330
[45] Date of Patent: Dec. 1, 1998

[54] CUTTERBAR HAVING CUTTING DISCS EQUIPPED FOR CONVERGING CROP

[75] Inventors: Craig Allen Richardson, Ottumwa; Allan Wesley Rosenbalm, Blakesburg; Michael Joseph Verhulst; Michael James Mellin, both of Ottumwa, all of Iowa

[73] Assignee: Deere & Company, Moline, Ill.

[21] Appl. No.: 896,694

[22] Filed: Jul. 18, 1997

[51] Int. Cl.⁶ ................................................. A01D 75/30
[52] U.S. Cl. ................................ 56/6; 56/13.6; 56/255
[58] Field of Search ............................. 56/6, 13.6, 255, 56/295

[56] References Cited

U.S. PATENT DOCUMENTS

| | | | |
|---|---|---|---|
| 3,950,923 | 4/1976 | Martensen et al. ........................ | 56/6 |
| 4,110,959 | 9/1978 | Oosterling et al. ....................... | 56/295 |
| 4,531,349 | 7/1985 | Ehrhart et al. ........................... | 56/13.6 |
| 4,694,640 | 9/1987 | Ermacora et al. ........................ | 56/16.4 |
| 4,827,704 | 5/1989 | Van Der Lely et al. .................. | 56/6 |
| 5,107,662 | 4/1992 | Haberkorn et al. ....................... | 56/6 |
| 5,404,695 | 4/1995 | Gemelli ...................................... | 56/6 |

Primary Examiner—Heather Shackelford

[57] ABSTRACT

A mower-conditioner has a header equipped with a rotary cutterbar for severing crop and directing it to a crop conditioner spanning a crop discharge opening centered rearwardly of the cutterbar and having a width some-what less than the length of the cutterbar. The cutter discs at the extreme outer ends of the cutterbar are equipped with upright, crop converging drums. For shorter cutterbars, paddles are mounted only to the tops of the cutter discs at the extreme outer ends of the cutterbars for operating in conjunction with the converging drums to move cut crop inwardly and rearwardly to the crop conditioner. For cutterbars of an intermediate length, paddles are also provided on the pair of discs respectively adjacent the discs at the extreme outer ends of the cutterbar and for cutterbars having a longer length, short crop converging drums are mounted to these adjacent discs.

5 Claims, 3 Drawing Sheets

5,842,330

CUTTERBAR HAVING CUTTING DISCS EQUIPPED FOR CONVERGING CROP

BACKGROUND OF THE INVENTION

The present invention relates to mowers including cutterbars having a plurality of rotary cutter discs mounted therealong and more specifically relates to such discs that are equipped for converging crop to a width commensurate with crop conditioners following the cutterbar.

Wide rotary mower-conditioners must convey crop from opposite ends of the cutterbar to a narrower conditioner mounted for receiving the cut crop. In many machines, converging any type of crop causes problems with cut quality at the outer ends of the cutterbar. A typical approach is to use multiple tall drums to move the crop inwardly. The inner drums restrict the area for the crop to flow and it bunches or hesitates and knocks down the uncut crop resulting in poor cut quality due to the crop being flat before the knife can cut it. These bunches also get recut requiring extra power and leave an undesirable product in the windrow.

Another approach for moving crop towards the center of the machine has been to provide the cutter disc with a paddle or extra raised portion to move the crop. The problem with these is that as they lift and move the crop, they tend to force it to the outside of the disc and onto uncut crop. Again, this causes cut quality problems. Further, while some previous designs do appear to work in some crop conditions, they do not work satisfactorily in other conditions.

SUMMARY OF THE INVENTION

According to the present invention, there is provided an improved rotary mower-conditioner cutterbar structure for moving cut crop inwardly from the outer portions of the cutterbar, and more particularly, there is provided improved structures for attachment to the cutter discs.

An object of the invention is to provide a rotary mower-conditioner cutterbar with at least the end-most cutter discs including crop-engaging paddles that act to move cut crop inwardly toward the center section of the cutterbar.

A more specific object of the invention is to provide a rotary mower-conditioner, as set forth in the previous object, wherein the paddles are mounted to diametrically opposite locations on the top of each cutter disc so as to have a crop engaging surface oriented in leading relationship to an adjacent cutter knife and with the crop engaging surface being angled such that a radially outer portion of the surface contacts the cut crop first with the crop then being moved along the surface away from the uncut crop and into engagement with an upright, generally cylindrical drum carried by the end-most cutter disc.

Another object of the invention is to provide a rotary mower-conditioner cutterbar having the end-most pair of cutter discs at opposite ends of the cutterbar each equipped with crop engaging paddles, and with a cylindrical, crop-engaging drum being carried by the end-most cutter discs.

Still another object of the invention is to provide a rotary mower-condition cutterbar constructed as stated in the immediately preceding object but further including a cylindrical crop-engaging drum mounted to each cutter disc respectively mounted next to the end-most cutter discs, these last-named drums being no taller than approximately half the height of the cylindrical drums mounted to the end-most cutter discs.

Yet another object of the invention is to provide paddles which are each formed from an angle member fixed to an associated disc so that corner of the angle member is located above the remainder of the disc in a first vertical plane which intersects and makes an acute angle with a second vertical plane passing through cutter knife mounting holes at diametrically opposite locations in the disc.

These and other objects will become apparent from a reading of the ensuing description together with the appended drawings.

DESCRIPTION OF THE PREFERRED EMBODIMENT

Figure 1:
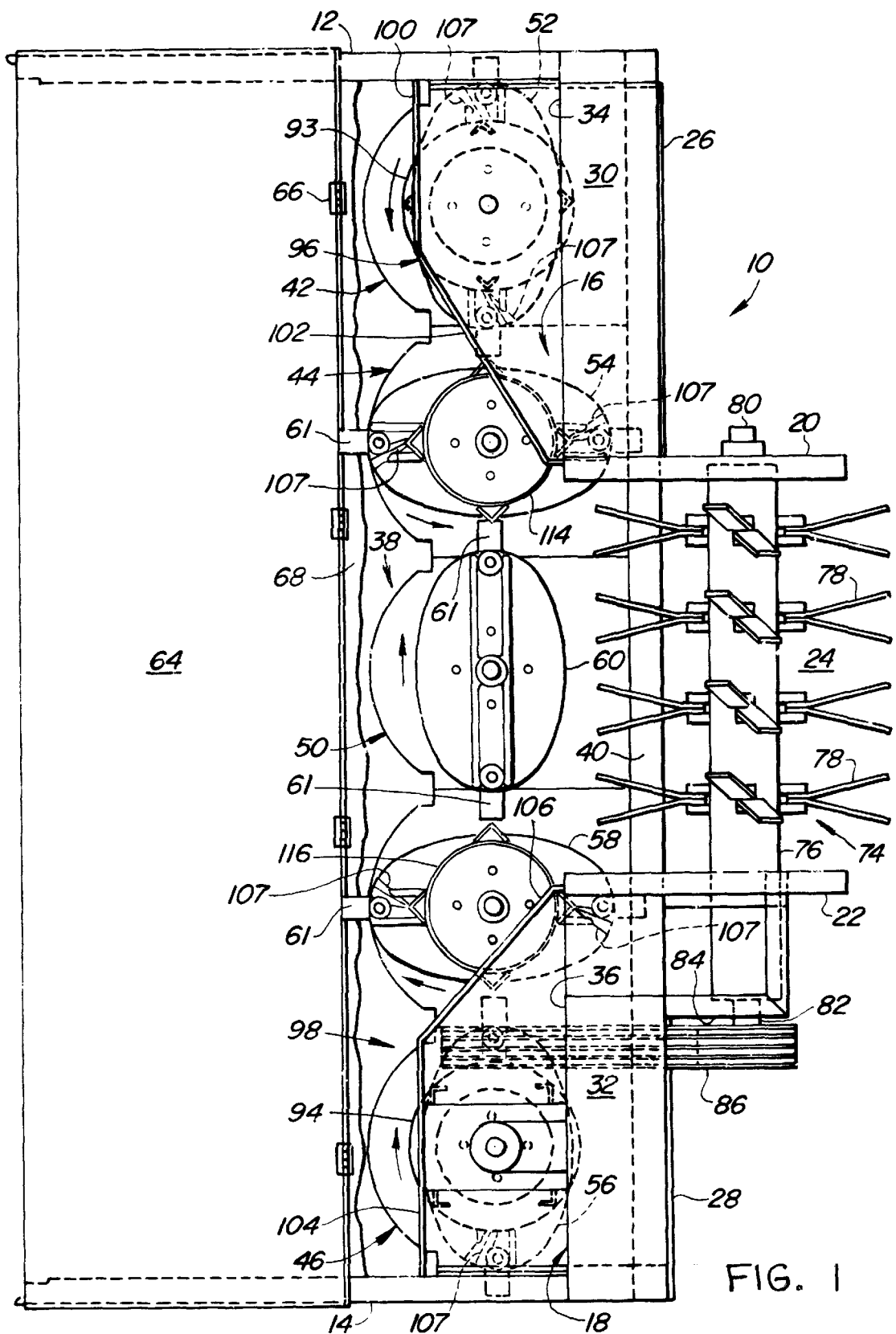
FIG. 1 is a somewhat schematic, top plan view of a header equipped with a rotary cutterbar, impeller conditioner and a crop convergence structure made in accordance with the principles of the present invention, but with the impeller conditioner hood removed, exposing the rotary impeller, and the rotary cutterbar shield broken away exposing part of cutterbar.
Figure 2:
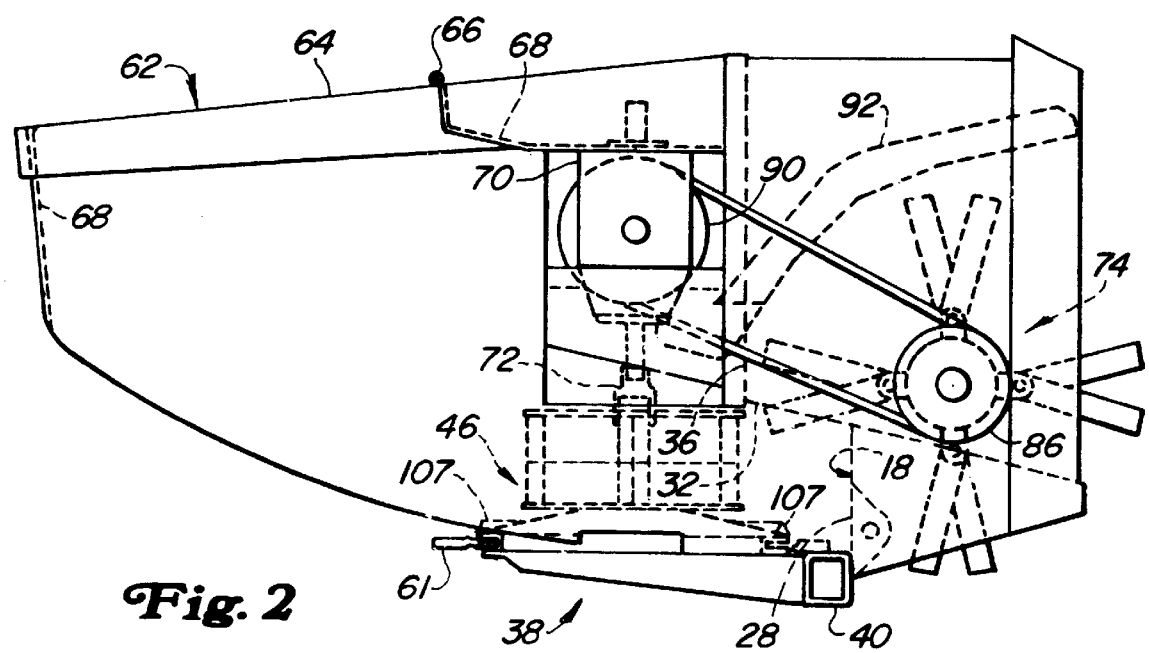
FIG. 2 is a left side elevational view of the header.
Figure 3:
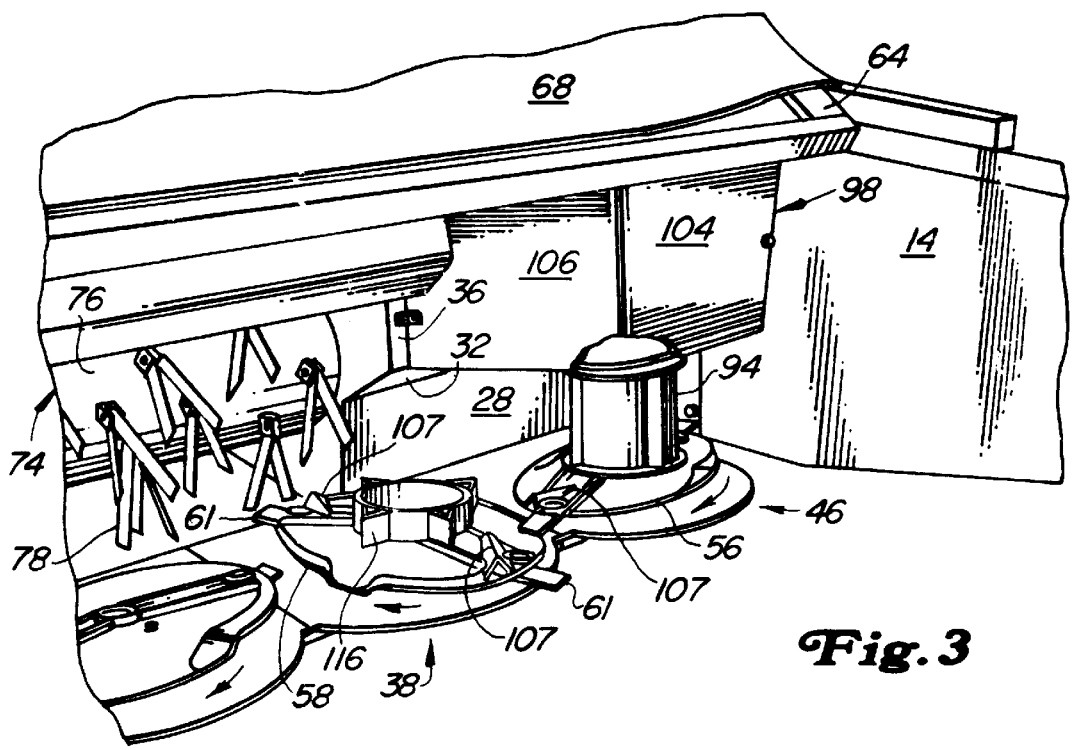
FIG. 3 is a perspective view looking towards the crop convergence structure at the front left portion of the header.

Referring now to FIGS. 1–3, a part of a mower-conditioner header 10 is shown including a body defined by right- and left-hand side walls 12 and 14, respectively. Right- and left-hand upright transverse walls or bulkheads 16 and 18, respectively, extend inwardly from the side walls 12 and 14 and terminate at the forward ends of right- and left-hand upright, fore-and-aft extending inner side walls 20 and 22 that define a crop discharge passage 24. While the walls 16 and 18 could be various upright configurations without departing from the present invention, they are here shown as including respective vertical lower sections 26 and 28, respective upward and forwardly inclined middle sections 30 and 32, and respective vertical upper sections 34 and 36.

An elongate rotary cutterbar 38 extends between the side walls 12 and 14. Extending the length of and defining a rear portion of the cutterbar 38 is a stiffener beam 40 of square cross section that is bolted to lower portions of the vertical lower bulkhead sections 26 and 28. While the present invention could be advantageously applied to rotary cutterbars of various constructions, the cutterbar 38 is a known type containing a plurality of intermeshed spur gears (not shown) including idler and drive gears coupled for effecting rotation of respective drive shafts of a plurality of cutting units spaced along the length of the cutterbar 38. For details of the cutterbar 38, reference may be had to U.S. Pat. No. 5,012,635, issued to Walters et al. on 7 May 1991, which is incorporated herein in its entirety by reference.

The cutting units are defined by a right-hand pair including a right-hand end cutting unit 42 and a right-hand inner cutting unit 44, by a left-hand pair including a left-hand end cutting unit 46 and a left-hand inner cutting unit 48, and by a center or middle cutting unit 50. The cutting units 42, 44, 46, 48 and 50 respectively include oval-shaped cutting discs 52, 54, 56, 58 and 60, with each cutting disc being provided with a pair of cutting blades 61 respectively pivotally mounted at opposite peripheral locations along a major axis of the disc. The inner sidewalls 20 and 22 are respectively spaced inwardly from the opposite ends of the cutterbar 38 just slightly more than the axes of rotation of the cutter discs of the cutting units 44 and 48.

Figure 4:
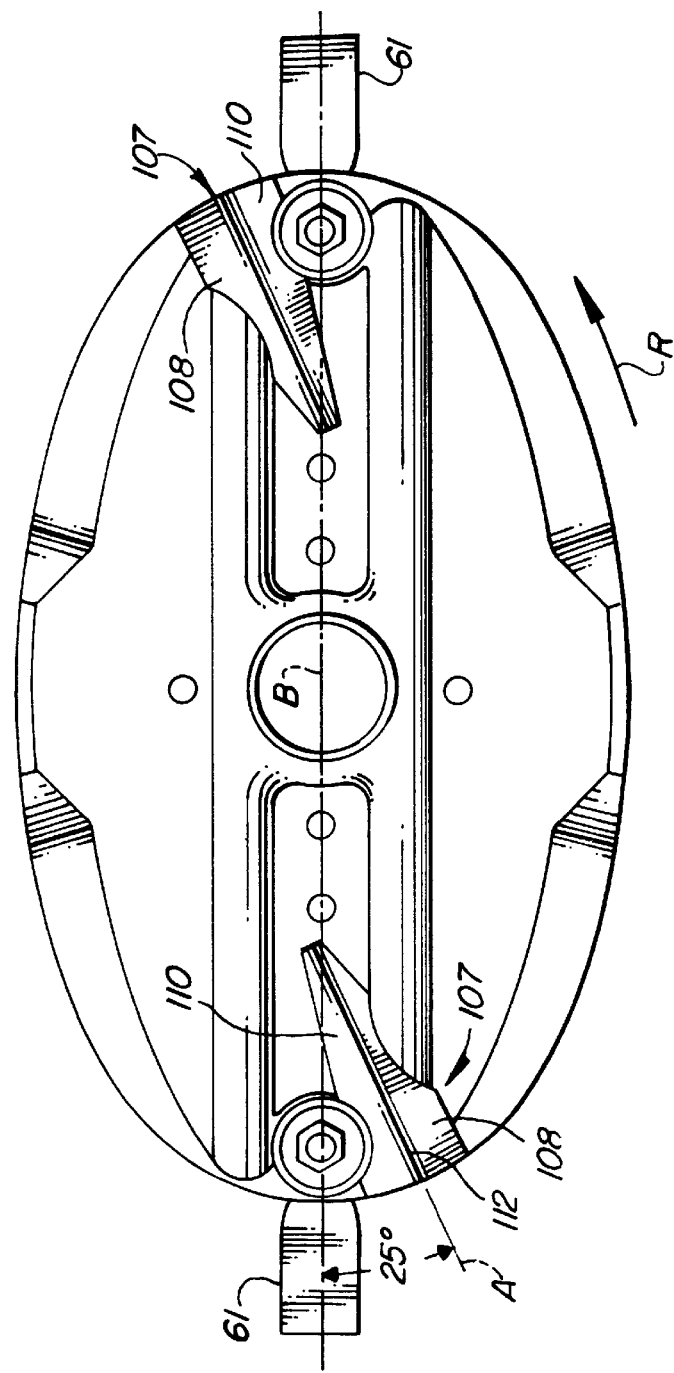
FIG. 4 is a top plan view of a typical disc equipped with crop-engaging paddles constructed in accordance with the present invention.

As shown in FIGS. 2–4, a shield 62 including a panel 64, which is rectangular in top plan view, extends between the side walls 12 and 14, and forwardly from a hinge joint 66 connecting the panel to a frame member 68 extending between the sidewalls 12 and 14, at an upper location of the header 10 spaced vertically above the cutterbar 38. The shield 62 further includes a rectangular sheet of flexible material 68 connected to a forward edge of the panel 64 so that it extends downwardly from the panel when the shield is in its working position shown in FIG. 2, the shield being shown pivoted backwardly to a non-use position in FIG. 3.

A main power distribution gear box 70 is located vertically above the left-hand end cutting unit 46 and includes a downwardly extending input shaft coupled, as at a double u-joint connection 72, to an upright drive shaft (not shown) for the cutter disc 56 of the cutting unit 46. The gearing contained in the gear box 70 and cutterbar 38 is arranged such that the left-hand pair of cutter discs 56 and 58 are both rotated in a clockwise direction, while the right-hand pair of cutter discs 52 and 54 are both rotated in a counterclockwise direction, the respective directions being indicated by arrows. The center cutter disc 60 is here shown as being rotated in the clockwise direction, but it could just as well be rotated counterclockwise without affecting the present invention. In any event, the directions of rotation of the various cutter discs result in crop being delivered toward the crop discharge passage 24.

Mounted across the crop discharge passage 24 for conditioning crop delivered thereto by the cutter discs is an impeller conditioner 74 including a tube 76 carrying a plurality of pivotally mounted flail knives 78 and having a right-hand end terminating adjacent the right-hand inner side wall 20, and having a left-hand end extending a short distance through the left-hand inner side wall 22. Coaxial right- and left-hand shafts 80 and 82, respectively, extend from the opposite ends of the tube 76 and are journaled in bearings (not shown) carried by the side wall 20 and a support wall 84 spaced leftwardly of the side wall 22. A multiple groove v-belt pulley 86 is mounted to the shaft 82 and is coupled, as by a plurality of v-belts 88, to a pulley 90 mounted to an output shaft extending rightwardly from the gear box 70. As can be seen in FIG. 2, a hood 92 extends over and adjacent a cylindrical path traced by the knives 78 so as to condition the crop carried by the knives.

Referring now also to FIG. 3, it can be seen that the right- and left-hand cutter discs 52 and 56 are respectively provided with ribbed drums 93 and 94 which are mounted to the right- and left-hand cutter discs 52 and 56 and cooperate with right- and left-hand guide structures 96 and 98 for guiding crop to the crop discharge passage 24, and, hence, to the impeller conditioner 74. The guide structure 96 includes an upright, transverse panel section 100 that extends inwardly from the right-hand side wall 12 a distance approximately equal to a minor dimension of the oval-shaped disc 52, the panel section 100 being joined to an oblique panel section 102 that extends rearwardly to a forward edge of the right-hand inner side wall 20. Similarly, the guide structure 98 includes an upright transverse panel section 104 that extends inwardly from the left-hand side wall 14 by a distance approximately equal to a minor dimension of the oval-shaped disc 56, the panel section 104 joining an oblique panel section 106 that extends rearwardly to a forward edge of the left-hand inner side wall 22.

Up to this point the structure described is that of a known mower-conditioner. The description which follows contains the instant invention.

Figure 5:
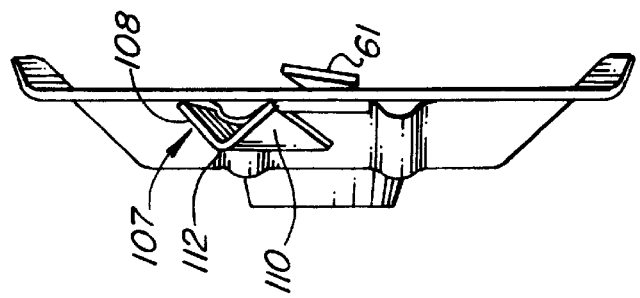
FIG. 5 is an end view of the disc shown in FIG. 4.

Fixed to diametrically opposite locations at the top of and extending inwardly from the periphery of each disc of the right-hand pair of cutting discs 52 and 54, and of each disc of the left-hand pair of cutting discs 56 and 58 is a pair of crop-engaging paddles 107 which serve to enhance the movement of cut crop from the ends of the cutterbar 38 to the crop discharge passage 24. Specifically, with reference also to FIGS. 4 and 5, it can be seen that the paddles 107 are each constructed from an angle member having respective legs 108 and 110 which join each other at a right angle so as to define a corner 112, with the corner 112, as considered viewing the disc from the top, extending along a first line A making an acute angle, shown here as being approximately 25°, with a second line B extending through the mounting areas of each of the cutting blades 61. While the angular disposition of the paddles 107 can vary somewhat, the general angular disposition of the paddles 107 has been found to be important to the successful operation of the paddles since it counteracts the tendency of crop to be forced outwardly by centrifugal force, such outward movement of the crop being unwanted since it would mash down uncut crop and cause the latter to be cut at an uneven height relative to crop that has not been forced down. Also the cut crop causing the uncut crop to be mashed down would be recut so as to leave an undesirable product in the windrow.

The paddles 107 are, with respect to the direction of rotation of the disc, arranged with their respective outer ends in leading relationship to the mounting areas for the cutting knives 61 and with their legs 108 defining a crop-engaging surface. While the tops of the cutting discs are somewhat of a convex shape, the legs 108 and 110 decrease in height inwardly with the corner 112 being disposed in parallel relationship to the knives 61.

Respectively mounted to the tops of the right- and left-hand inner discs 54 and 58 are relatively short crop-engaging drums 114 and 116. The drums 114 and 116 are less than half the height of the outer drums 92 and 94 so that the flow of crop from the outer part of the cutterbar 38 to the crop discharge passage 24 will not be impeded but rather will pass over the tops of the shorter drums 114 and 116.

It is here noted that there is actually no need for any crop converging elements to be attached to the tops of the right- and left-hand inner discs 54 and 58 when the cutterbar is of a length including seven discs or less, as shown here. Further, it is to be noted that for cutterbars longer than those having seven discs, those having eight discs for example, adequate convergence is obtained if the right- and left-hand inner discs are equipped only with the paddles 107. The usage of converging elements on the right- and left-hand pairs of discs 52 and 54 and on the left-hand pair of discs 56 and 58, as shown, is actually necessary when cutterbars of a length employing nine discs is used.

The operation of the mower-conditioner 10, as concerns the crop converging paddles 107 and crop engaging drums 114 and 116, is thought to be evident from the foregoing description. Suffice it to say, that the paddles 107 operate to move cut crop away from the uncut crop and toward the discharge passage 24 in such an efficient manner that the cut crop does not bunch up to cause the uncut crop to be mashed down so as to impede desired cutting thereof.

We claim:

1. In a header for an agricultural harvester including right- and left-hand upright sidewalls, a cutterbar extending transversely between the right- and left-hand sidewalls and including a plurality of rotary cutting units spaced there along, with each cutting unit including a cutter disc mounted for rotating about an upright axis and having a pair of cutting knives respectively pivotally mounted at opposite knife mount locations adjacent a periphery of said cutter disc, said cutter discs including right- and left-hand end cutting discs, a crop discharge passage located centrally behind the cutterbar and being defined by upright, right- and left-hand inner side walls, a crop conditioner extending between said inner side walls for engaging crop delivered thereto by said cutting discs of said cutterbar, said right- and left-hand end cutting discs each having a crop-engaging outer drum mounted thereto for rotation therewith about its respective upright axis, the improvement comprising: said right- and left-hand end cutting discs each having a pair of crop-engaging paddles mounted thereto respectively in leading relationship to the pair of cutting knives associated with the disc, as considered with respect to a respective direction of rotation of said right- and left-hand end cutting discs; and each of said paddles having a leading crop-engaging surface extending from the periphery of the associated disc along a first line making an acute angle with a second line extending through the knife mount locations of the associated disc.

2. The header defined in claim 1 wherein each paddle is defined by an angular piece of material having first and second legs joined to form a corner; and said corner lying along said first line.

3. The header defined in claim 2 wherein said paddle corner lies along a third line that is perpendicular to the upright axis about which the associated disc rotates.

4. The header defined in claim 1 wherein said plurality of cutter discs includes right- and left-hand inner discs respectively adjacent said right- and left-hand end discs; and said right- and left-hand inner discs each being provided with a pair of paddles like those mounted on each of said right- and left-hand end discs.

5. The header defined in claim 4 wherein said right- and left-hand inner discs are respectively provided with right- and left-hand, crop-engaging inner drums that are approximately half the height of said outer drums, whereby cut crop may flow over the inner drums when fed towards said crop discharge passage.

* * * * *